United States Patent [19]

Bratten

[11] Patent Number: 4,684,378
[45] Date of Patent: Aug. 4, 1987

[54] METHOD AND APPARATUS FOR REMOVING PAINT OVERSPRAY

[76] Inventor: Jack R. Bratten, 5970 St. James Dr., West Bloomfield, Mich. 48033

[21] Appl. No.: 761,658

[22] Filed: Jul. 31, 1985

Related U.S. Application Data

[63] Continuation of Ser. No. 597,675, Apr. 6, 1984, abandoned.

[51] Int. Cl.⁴ .............................................. B01D 46/04
[52] U.S. Cl. ............................................ 55/96; 55/99; 55/291; 55/293; 55/300; 55/DIG. 46; 118/326
[58] Field of Search ...................................... 55/96–99, 55/291, 293, 295, 300, 351, DIG. 46; 98/115.2; 118/326, 634, DIG. 7

[56] References Cited

U.S. PATENT DOCUMENTS

| | | | |
|---|---|---|---|
| 3,252,271 | 5/1966 | Hatch et al. | 55/99 |
| 4,113,454 | 9/1978 | Cvacho | 118/DIG. 7 X |
| 4,193,777 | 3/1980 | de la Riviera | 55/96 |
| 4,222,749 | 9/1980 | Moss | 55/99 X |
| 4,257,783 | 3/1981 | Gutjahr et al. | 55/99 X |
| 4,308,036 | 12/1981 | Zahedi et al. | 55/99 X |

FOREIGN PATENT DOCUMENTS

| | | | |
|---|---|---|---|
| 1456285 | 11/1976 | United Kingdom | 118/326 |
| 0660726 | 5/1979 | U.S.S.R. | 118/DIG. 7 |

Primary Examiner—Charles Hart
Attorney, Agent, or Firm—John R. Benefiel

[57] ABSTRACT

A method and apparatus are disclosed for removing paint overspray suspended in air exhausted from a paint spray booth, in which the exhausted air is drawn through a conveyor-carried bed of small diameter beads or granules of plastic or other material allowing only a mild adherence of the paint to their surfaces upon drying. The paint overspray is removed from the air by being deposited on the surfaces of the beads as the air passes through the beads and paint is subsequently rapidly dried on the bead surfaces in a drying chamber. The paint carrying beads are then mechanically agitated to dislodge the dried paint to clean the beads for reuse, and the dislodged paint particles are separated from the cleaned beads for collection and disposal.

16 Claims, 2 Drawing Figures

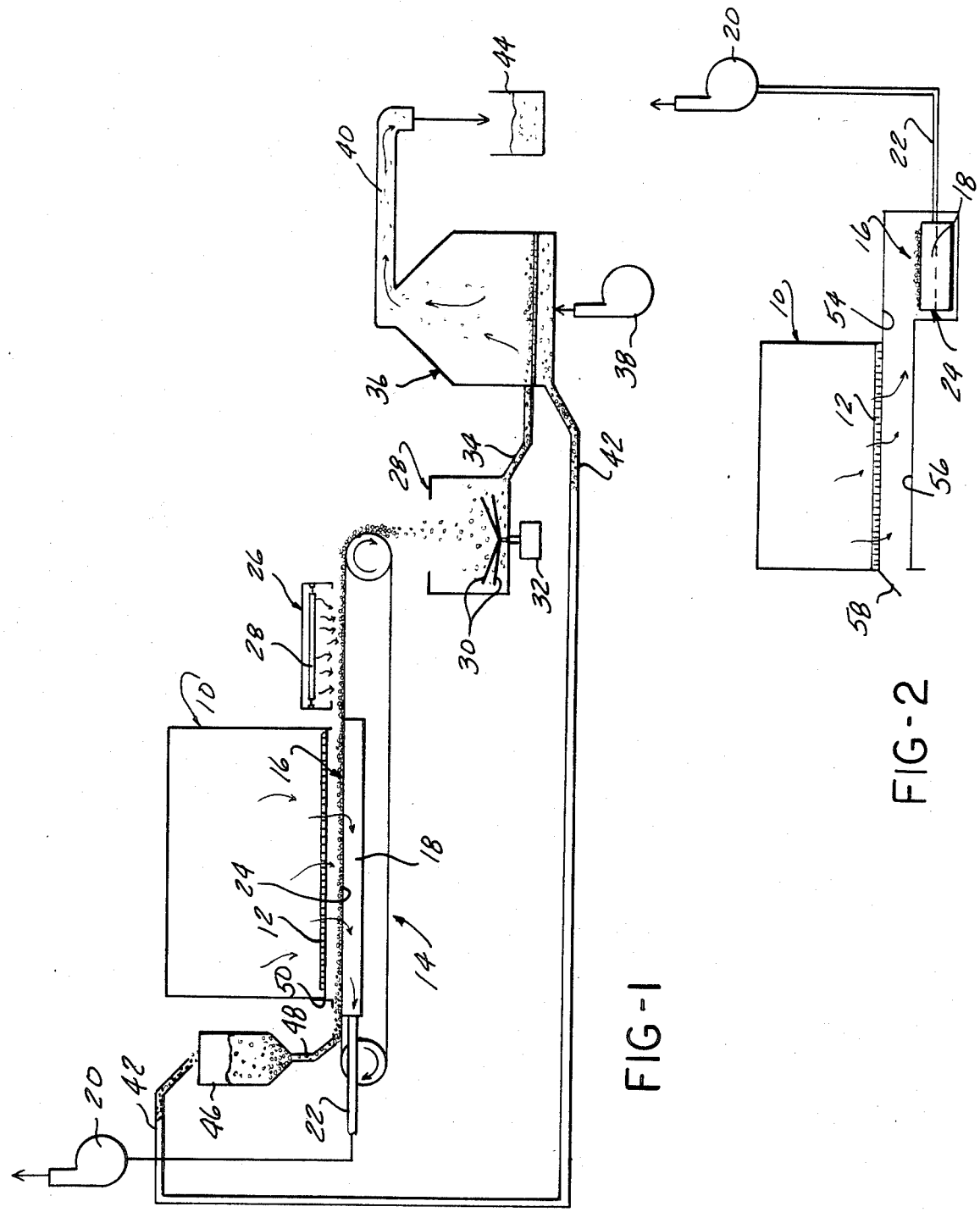

METHOD AND APPARATUS FOR REMOVING PAINT OVERSPRAY

This application is a continuation of application Ser. No. 597,675, filed Apr. 6, 1984 and now abandonded.

BACKGROUND DISCUSSION

The present invention concerns air cleaning processes and apparatus and more particularly such processes and apparatus adapted to remove paint overspray from air exhausted from paint spray booths.

In the production of automobiles, the surfaces of the car bodies are painted by a paint spraying process, typically conducted within a paint spray booth. The paint spraying operation inevitably results in paint overspray, i.e., a suspension of atomized paint in the surrounding air. The air in the spray booth must be continuously exhausted to prevent an excessive buildup of paint overspray in the air.

The air exhausted from the paint spray booth must have the suspended paint residual solids removed prior to its exhaust to the atmosphere. The conventional practice has been to pass the exhausted air through water washing air cleaners into which the paint solids are absorbed, causing the formation of a water-paint solid sludge.

While effectively removing the paint residuals from the exhausted air, the water washing process creates tremendous volumes of a water-paint sludge and it is difficult to handle and to dispose of the sludge.

Another approach, described in U.S. Pat. No. 4,257,783 to Gutjahr et al, utilizes a solid medium for collecting the paint solids by causing the paint to be deposited on solid surfaces. After drying, the paint solids are subsequently removed from the surfaces for disposal. In one version, a filtering conveyor carries an exposed surface which collects paint solids from the exhausted air, and various methods are used for subsequent removal of the dried paint from the conveyor surface, such as applying paint solvents and the like.

In a second embodiment described in that patent, the conveyor surface is cleaned by heated sand jets to mechanically remove the paint residuals. The mixture of the paint residuals and sand is then burned to eliminate the paint residuals from the mixture.

In yet another version, a bed of granular media, such as alumina, is utilized to absorb the paint residuals, with either solvents or burning utilized to remove the paint residuals to allow reuse of the alumina in the process.

All of these methods involve relatively complex apparatus including combustion chambers, etc., or require use of quantities of chemicals such as solvents.

Therefore, it is an object of the present invention to provide a process and apparatus for cleaning the air exhausted from paint spray booths of overspray paint residuals which does not involve water washing nor produce a sludge as a byproduct.

It is another object of the present invention to provide a process and apparatus for cleaning air exhausted from paint spray booths which is relatively simple and does not necessarily involve the use of paint solvents, or the burning of paint solids in combustion chambers, or the like.

It is still another object of the present invention to provide a process and apparatus for cleaning the air exhausted from paint spray booths which is economical in operation and does not necessitate the use of large quantities of energy or material in its performance.

SUMMARY OF THE INVENTION

These and other objects of the present invention, which will become apparent upon a reading of the following specification and claims, are achieved by a process and apparatus utilizing a bed of beads or granules composed of a material which collects the paint overspray solids as the air passes through the bed, but to which the collected paint will only be mildly adherent after the paint has dried.

The beads carrying the deposited paint solids are moved to a drying chamber for drying of the paint solids on the surfaces of the beads.

The beads having the dried paint deposited thereon are subsequently subjected to mechanical agitation. The beads are of sufficient size and mass so that the agitator loosens and dislodges the dried paint from the bead surfaces to create a mixture of relatively lightweight particles of paint solids intermixed with the cleaned beads.

This mixture is then subjected to a separation process step, as by an air updraft separator, to separate the cleaned beads from the particles of dislodged paint solids.

The paint solids are collected for disposal and the cleaned beads recirculated for reuse in the process.

The bed of beads or granules is preferably disposed on a conveyor having a first section located beneath the paint spray booth, the conveyor surface being permeable to air flow such that the air withdrawn from the paint spray booth passes firstly through the bed of beads and thence through the conveyor surface and into a plenum chamber over which the conveyor passes. The cleaned air is then passed into the air exhaust system.

In one embodiment, the section of the conveyor which receives the air exhaust flow is located directly beneath the grating in the paint spray booth, such that the air moves downwardly through the bed of filtering granules or beads. In a second embodiment, the conveyor section through which the air flow occurs is laterally offset and the air flow passes downwardly and horizontally prior to flowing through the beads. This avoids excessive deposits of paint overspray on the beads due to spillage or direct spray from operations in the spray booth.

The depth of the bed of filtering beads provides collection surfaces consisting of the surfaces of the individual beads adequate for complete removal of the paint overspray solids, while not requiring an excessive static pressure drop with the air being drawn through.

In one example of the invention, polystyrene beads approximately one-eighth inch in diameter and at a depth of one inch produce a satisfactory removal of the paint overspray solids as described. The polystyrene plastic material produces the desired mild adherence of the paint solids in the case of paints for metal surfaces, and simple mechanical agitation yields substantially complete loosening and dislodging of the dried paint.

The conveyor has a second section passing into a drying chamber, and the conveyor is periodically advanced to convey beads laden with collected paint to this second location, whereat drying occurs as by heating in the drying chamber. This facilitates and accelerates the drying process.

After drying, the beads carrying the paint residuals are collected in a container within which is disposed one or more rotatable blades which are rotated to cause agitation of the beads and consequent dislodging and loosening of the paint solids therefrom.

The mixture of particles of dislodged paint solids and cleaned beads are separated in a separate chamber with an updraft flow of air arranged to carry off the dislodged paint solid particles, while allowing the cleaned beads to move to the bottom of the container, since the dislodged paint solids are of much lighter mass.

The cleaned beads are then recirculated to a hopper located just ahead of the conveyor first section, passing beneath the paint spray booth floor, such that an outflow from the hopper of the cleaned beads deposits beads on the conveyor surface to form the bed of beads. A wiper bar may be disposed over the conveyor which insures a uniform depth of beads as the conveyor is advanced to cause a fresh bed of filtering beads to pass into the location beneath the paint spray booth.

DESCRIPTION OF THE DRAWINGS

FIG. 1 is a diagrammatic representation of an apparatus according to the present invention for removal of suspended paint solids from the air exhausted from a paint spray booth.

FIG. 2 is a diagrammatic representation of a portion of the apparatus shown in FIG. 1 showing an alternate arrangement of certain components depicted therein.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to FIG. 1, the present invention contemplates cleaning of air exhausted from a paint spray booth 10 of suspended paint solids as typically result from paint spraying operations within paint spray booths.

According to the present invention, the air is exhausted from paint spray booth 10 through the floor and for this purpose the floor of the paint spray booth 10 may consist of a grating or other suitable structure allowing air flow therethrough, while affording support for the equipment and personnel necessary for the paint spraying operation.

Passing beneath the grating 12 of the paint spray booth 10 is a conveyor 14 which includes a first section located beneath the paint spray booth 10. Disposed atop the upper conveyor surface is a bed of filter media material which consists of coarse granules or beads 16, as of polystyrene plastic. Such material is widely available commercially as a frit used in plastic molding processes.

The bed of beads is of a sufficient depth and the beads 16 are of an appropriate size to establish a filtering area on the surfaces thereof adequate to substantially completely remove the paint spray solids suspended in air flow passing therethrough, but without requiring an excessive static pressure drop.

A size of one-eighth inch polystyrene beads disposed at a depth of one inch has been found to provide suitable characteristics for this purpose.

In the embodiment of FIG. 1, the section of the conveyor at the first location of the conveyor passes over a plenum chamber 18 and the conveyor itself consists of a conveyor belt of an open weave or other porous configuration such as to allow air flow therethrough after passing through the bed of beads.

Air flow may be induced therethrough by means of a blower or other suitable air circulation means 20, drawing air through the beads and directing the cleaned air to an exhaust duct 22 for exhaust to the atmosphere.

A suitable arrangement for removing solvents is normally required, but is not shown since that does not form a part of the present invention.

Thus, air is exhausted from the paint spray booth 10 through the grating 12, passes through the bed of beads or granules 16, thence through the conveyor belt 24, and into the plenum chamber 18, and from there to exhaust or other parts of the air treatment system.

The conveyor 14 also has a section passing through a second location at which is located a drying chamber 26, which may have a suitable enclosure and source of heat indicated diagrammatically at 28. The heat source may take many forms including the use of waste heat from drying ovens for the auto bodies, or direct heat source such as electrical resistance heaters or the like. The heat causes rapid drying of the paint carried on the granules or beads disposed at the second location on the conveyor belt.

The conveyor belt 24 is adapted to be periodically advanced after the bed has been saturated with paint, to move the bed of granules or beads from the first location whereat it receives the exhaust air flow to the second location whereat the drying chamber 26 is located such as to enable rapid drying of the deposited paint overspray solids carried on the beads or granules.

After such drying is completed, the beads or granules carrying the dried paint residuals are collected in a container 28 as by simply passing these off the conveyor belt 24 as indicated in FIG. 1. Within the container 28 are one or more rotatable blades 30 with means for rotating these blades, as by a drive motor 32, which causes the whirling of the rotatable blades which in turn causes mechanical agitation of the beads within the container 28 against each other, the blades and the container walls, such that the solids are dislodged and loosened from the beads.

The use of particular materials to form the beads is required so that there will be only a mild adherence of the dried paint to the beads. The beads are of sufficient mass so that this simple mechanical agitation is sufficient to produce a substantially complete cleaning of the beads, although slight residual coating of paint will not interfere with successful practice of the invention. Polystyrene plastic has been found suitable for paint compositions intended for painting of metallic surfaces.

For different paint compositions, different materials may be employed, such as the use of walnut shell fragments, which are sufficiently strong to be able to sustain the forces of mechanical agitation necessary to result in substantially complete cleaning of the dried paint residual therefrom, with only a slight grinding down of the beads themselves.

The mixture of dislodged dried paint particles and cleaned beads is transferred by means of a conduit 34, as by pneumatic flow arrangements not shown but well known to those skilled in the art to a separation means consisting of a separation chamber 36, indicated diagrammatically in FIG. 1.

Such separation means may take many forms, such as an updraft air flow separator, in which a blower 38 directs an upflow of air into the chamber interior 36 into which is passed the mixture of dried and dislodged paint solids and cleaned beads. The paint solids will have a much lower mass than the beads, since the paint solids are fragmented by the agitation process and, accordingly, will be blown out of the separation chamber 36 through a ducting 40 located in the upper region of the converging housing, as shown. The granules or beads will be collected in the lower region of the housing 36, being of much greater mass, and may be withdrawn through ducting 42.

The separated paint solids may thus be conveniently collected for dry disposal in a container 44, while the cleaned beads are recirculated by a circulation means of conventional design through a conduit 42 to a supply hopper 46. Supply hopper 46 is located immediately upstream above the conveyor 14, at a location upstream from the first location at which the air filtration occurs such as to enable a depositing of the beads through a spout 48 onto the upper surface of the conveyor 14.

A leveling bar 50 may be employed to insure an appropriate depth of the granules on the conveyor upper surface as shown.

Accordingly, it can be appreciated that this apparatus and process provides a relatively simple means for collecting and disposing of the paint overspray residuals, such that the air exhausted from the paint spray booth may be safely exhausted to the atmosphere. It does not involve the consumption of materials such as solvents, or the substantial expenditure of energy, such as to be very economical in operation. The collected paint solids are in a form very convenient for solid waste disposal in any desired manner.

Each of the elements of the apparatus and the bead material are available commercially such that the apparatus may be constructed at low cost and the process is able to be practiced at low cost as well.

It sometimes occurs that droppings of paint residuals may fall through the grating 12, as when paint is directed towards the floor of the paint spray booth when cleaning spray guns, which occurrence has a tendency to oversaturate the filter media bed. Accordingly, an alternate arrangement is contemplated, shown in FIG. 2, for location of the conveyor 24, in which the conveyor 24 is located beneath the grating 12 and paint spray booth 10, but offset laterally by means of a ducting 54 terminating in the plenum chamber 18 and the exhaust ducting 22 and blower 20. This avoids saturation of portions of the bed of beads 16 by an excessive dropping of paint residuals which instead will be collected on the surface 56 of the ducting chamber 54. Periodic cleanout of this space is enabled by access door 58.

Thus, the air suspended paint solids or residuals are removed by the bed of beads 16, but such droppings of paint solids will not cause saturation of the bed of beads 16 to render their removal difficult.

The use of the granules or beads produces a highly advantageous air filtration media for removal of the paint spray solids due to the relatively great surface area available for collection and deposit of the paint spray solids thereon. At the same time, the nature of this filter media allows a relatively simple mechanical cleaning of this media to avoid the necessity for burnoff, solvent treatment, etc., for the reuse of the filter media which allows economical operation of the process.

Accordingly, it can be appreciated that the above-recited objects of the present invention are achieved by the apparatus and process described herein.

It is noted that each of the components thereof are conventional and are commercially available and, accordingly, the details thereof are not set out in order to make clear the principles of the process and apparatus and insofar as these components do not form of themselves the present invention.

Many variations in such components are of course possible within the concept of the present invention as set out in the following claims.

I claim:

1. A process for removing paint overspray suspended in air comprising the steps of:
    forming a bed of beads of material to which said paint will be adherent thereto when dried but readily allow substantially complete dislodging soley by mechanical agitation of the beads;
    circulating said paint carrying air through said bed of beads to cause deposition of said paint on the surfaces of said beads in said bed;
    drying the paint deposited on the beads to form a solid deposit of dried paint on the surface of said beads;
    subsequently mechanically agitating said beads after completion of said drying step said step of mechanically agitating said beads carried out in the absence of any substantial heating of said dried paint carrying beads to substantially completely loosen and dislodge said dried paint from said bead surfaces solely by said mechanically agitating said beads; and
    separating said dislodged paint from said beads.

2. The process according to claim 1 wherein said separated beads are recirculated to again form a bed through which paint carrying air is circulated.

3. The process according to claim 1 wherein said beads are formed of a plastic material to which said paint will not tightly adhere.

4. The process according to claim 1 wherein in the step of forming said bed of beads, said beads are deposited on a porous conveyor belt allowing air to pass therethrough, and wherein said air is passed through said bed of beads and subsequnetly through said conveyor belt at a particular location on said belt.

5. The process according to claim 4 wherein said conveyor is periodically advanced to cause said bed of beads to be conveyed to a different location whereat said drying step is carried out.

6. The process according to claim 5 wherein a fresh bed of beads is conveyed to said first-named located as said bed is conveyed to said different location.

7. The process according to claim 1 wherein said step of agitating said beads comprises the step of depositing beads with dried paint thereon in a container having rotating blades therein to cause said agitation.

8. The process according to claim 1 wherein said bed of beads are of a diameter on the order of one-eight inch and said bed is of a depth on the order of one inch to substantially completely remove said paint, while avoiding an excessive static drop in said air flow therethrough.

9. Apparatus for removing suspended paint from overspray in a paint spray booth comprising:
    a grating positioned below said spray booth;
    a conveyor positioned below said spray booth;
    means for forming a bed of coarse granules on the upper surface of said conveyor and below said grating, said granules having a characteristic such that said paint will be deposited thereon and said granules formed of material to be only mildly adherent to said paint upon drying of said paint, and being of a sufficient mass so as to be able to be readily and substantially completely loosened and dislodged solely by mechanical agitation thereof and due to said mile adherence thereto;

means for drawing air from said spray booth through said bed of granules at a first location on said conveyor to cause said paint to be deposited thereon;

said conveyor extending from said first location to a second location;

drying chamber means at said second location adapted to cause paint on said granules to be substantially completely dried to form a layer of substantially completely dried paint on said granules;

means for periodically advancing said conveyor to cause a section of said bed of granules to be advanced from said first location to said second location;

agitator means receiving said granules after passing through said drying chamber means for mechanically agitating said granules after said paint has been dried thereon in the absence of any substantially heating of said granules to cause said substantially complete loosening and dislodging of said dried paint solely by said mechanical agitating and, separator means for separating said granular material from said dislodged paint.

10. The apparatus according to claim 9 wherein said conveyor is positioned directly beneath said grate so that air flow is drawn periodically directly down through said bed.

11. The apparatus according to claim 9 wherein said conveyor is located below said grating but offset laterally so that air flow from said spray booth is drawn downwardly and horizontally prior to flowing through said bed.

12. The apparatus according to claim 9 further including recirculating means for collecting said granules after removal of said paint and depositing said granules onto said conveyor ahead of said first location.

13. The apparatus according to claim 9 wherein said conveyor is configured to enable air flow therethrough and wherein said means for drawing air through said bed includes a plenum chamber over which said conveyor passes, and means for drawing air from said plenum chamber to induce air flow through said bed of granules and thence through said conveyor.

14. The apparatus according to claim 9 wherein said means for mechanically agitating said granules comprises a container, rotatable blades mounted in said container, means for collecting said granules from said drying chamber and depositing the same into said container, and means for rotating said blades to mechanically agitate said granules to dislodge said dried paint.

15. The apparatus according to claim 9 wherein said means for separating said dislodged paint and said granules comprises a chamber receiving said granules and dislodged paint mixture and means for directing an upflow of air therethrough to cause said dislodged dried paint to flow out of said container.

16. The apparatus according to claim 9 wherein said coarse granules are composed of polystyrene beads sized on the order of one-eighth inch in diameter.

* * * * *

UNITED STATES PATENT AND TRADEMARK OFFICE
CERTIFICATE OF CORRECTION

PATENT NO. : 4,684,378

DATED : August 4, 1987

INVENTOR(S) : Jack R. Bratten

It is certified that error appears in the above-identified patent and that said Letters Patent is hereby corrected as shown below:

Column 6, line 42 (Claim 4), "subsequnetly" should be --subsequently--.

Column 6, line 49 (Claim 6), "located" should be --location--.

Column 6, line 56 (Claim 8), "one-eight" should be --one-eighth--.

Column 7, line 6 (Claim 9), "mile" should be --mild--.

Column 7, lines 23-24 (Claim 9), "substantially" should be --substantial--.

Signed and Sealed this

Twelfth Day of January, 1988

Attest:

DONALD J. QUIGG

Attesting Officer

Commissioner of Patents and Trademarks